(12) United States Patent
Lekar et al.

(10) Patent No.: US 10,682,900 B2
(45) Date of Patent: Jun. 16, 2020

(54) SHADING DEVICE FOR A VEHICLE INTERIOR

(71) Applicants: Jan Lekar, Ostfildern (DE); Matthias Maier, Esslingen (DE); Huan Tran, Ostfildern (DE)

(72) Inventors: Jan Lekar, Ostfildern (DE); Matthias Maier, Esslingen (DE); Huan Tran, Ostfildern (DE)

(73) Assignee: BOS GMBH & CO. KG, Ostfildern (DE)

( * ) Notice: Subject to any disclaimer, the term of this patent is extended or adjusted under 35 U.S.C. 154(b) by 363 days.

(21) Appl. No.: 15/438,857

(22) Filed: Feb. 22, 2017

(65) Prior Publication Data

US 2017/0253109 A1 Sep. 7, 2017

(30) Foreign Application Priority Data

Mar. 2, 2016 (DE) .......................... 10 2016 203 382

(51) Int. Cl.
*B60J 1/20* (2006.01)

(52) U.S. Cl.
CPC .............. *B60J 1/208* (2013.01); *B60J 1/2016* (2013.01); *B60J 1/2025* (2013.01); *B60J 1/2027* (2013.01);
(Continued)

(58) Field of Classification Search
CPC ........ B60J 1/2011; B60J 1/2013; B60J 1/208; B60J 1/2044; B60J 1/2052; B60J 1/2016;
(Continued)

(56) References Cited

U.S. PATENT DOCUMENTS 6,086,133 A * 7/2000 Alonso .................. B60J 1/2019
160/23.1
6,125,908 A * 10/2000 Ament .................... B60R 5/047
160/323.1
(Continued)

FOREIGN PATENT DOCUMENTS

DE 10 2007 058 262 A1 5/2009
DE 10 2011 103 514 A1 12/2012
(Continued)

OTHER PUBLICATIONS

Search Report of European Patent Office issued in Application No. 17 15 7261 with English translation of category of cited documents dated Jul. 28, 2017 (9 pages).
(Continued)

*Primary Examiner* — Johnnie A. Shablack
(74) *Attorney, Agent, or Firm* — Flynn Thiel, P.C.

(57) ABSTRACT

Shading device for a vehicle interior including a flexible shading structure displaceable between a compactly stored rest position and a deployed shading position and which is provided with a pull-out profile on an end region. The pull-out profile has a central portion and on opposite end sides of the central portion has telescopic shiftable guiding portions which are displaceable in vehicle-related guidances. A shield is disposed on the central portion and is mounted to be movable relative to the central portion between a rest condition and a functional condition, and a forced control device is provided for displacement of the shield in at least one direction between the rest condition and the functional condition to displace the shield in response to a shifting movement of at least one guiding portion.

17 Claims, 6 Drawing Sheets

(52) U.S. Cl.
CPC ........... *B60J 1/2041* (2013.01); *B60J 1/2044* (2013.01); *B60J 1/2052* (2013.01)

(58) Field of Classification Search
CPC ...... B60J 1/2025; B60J 1/2027; B60J 1/2041; B60J 1/2036; B60J 1/2066; B60J 1/2075; B60J 1/2083; B60J 1/2077; E06B 9/64; E06B 9/42; E06B 9/40
USPC ....... 160/41, 370.21, 370.22, 242, 243, 246, 160/247, 250
See application file for complete search history.

(56) References Cited

U.S. PATENT DOCUMENTS

| | | | | |
|---|---|---|---|---|
| 6,557,616 | B2* | 5/2003 | Schlect | B60J 1/2019 160/265 |
| 7,089,992 | B2* | 8/2006 | Walter | B60J 1/2027 160/370.22 |
| 7,316,443 | B2* | 1/2008 | Schlecht | B60J 1/2027 160/370.22 |
| 7,396,067 | B2 | 7/2008 | Thumm et al. | |
| 7,628,437 | B2* | 12/2009 | Zaiser | B60R 5/047 160/370.22 |
| 8,061,757 | B1* | 11/2011 | Moore | B60J 1/2019 160/370.22 |
| 8,146,980 | B2* | 4/2012 | Takeuchi | B60J 1/2025 160/370.22 |
| 8,215,697 | B1* | 7/2012 | Lin | B60J 1/2027 160/23.1 |
| 8,308,217 | B2* | 11/2012 | Patel | B60J 3/0208 160/370.22 |
| 8,905,116 | B2* | 12/2014 | Weinbrenner | B60J 1/208 160/24 |
| 9,033,022 | B2* | 5/2015 | Katada | B60J 1/2038 160/370.22 |
| 9,303,452 | B2* | 4/2016 | Hofmann | B60J 1/2019 |
| 9,511,733 | B2* | 12/2016 | Maier | B60R 21/06 |
| 9,616,733 | B2 | 4/2017 | Maier | |
| 9,649,914 | B2* | 5/2017 | Meier | B60J 1/2038 |
| 9,764,624 | B2* | 9/2017 | Maier | B60J 1/2063 |
| 9,914,342 | B2* | 3/2018 | Maier | B60J 1/2027 |
| 10,093,155 | B2* | 10/2018 | Tisdale | B60J 1/2063 |
| 2005/0263257 | A1* | 12/2005 | Hansen | B60J 1/2027 160/370.22 |
| 2006/0021721 | A1* | 2/2006 | Walter | B60J 1/2027 160/315 |
| 2006/0219372 | A1* | 10/2006 | Hansen | B60J 1/2027 160/370.22 |
| 2007/0095489 | A1 | 5/2007 | Thumm et al. | |
| 2008/0083518 | A1* | 4/2008 | Sadornil Santamaria | B60J 7/0015 160/370.21 |
| 2009/0079222 | A1* | 3/2009 | Hansen | B60J 1/2044 296/97.4 |
| 2011/0036515 | A1* | 2/2011 | Lin | B60J 1/2019 160/238 |
| 2012/0186756 | A1* | 7/2012 | Lin | B60J 1/2027 160/323.1 |
| 2013/0008619 | A1* | 1/2013 | Katada | B60J 1/2055 160/309 |
| 2014/0138981 | A1* | 5/2014 | Lin | B60J 1/2038 296/97.4 |
| 2014/0202645 | A1* | 7/2014 | Lin | B60J 1/2091 160/370.21 |
| 2015/0328965 | A1* | 11/2015 | Lin | B60J 1/2044 74/99 R |
| 2016/0031294 | A1* | 2/2016 | Maier | B60J 1/2011 160/370.21 |
| 2016/0031295 | A1* | 2/2016 | Maier | B60J 1/2063 160/370.21 |
| 2016/0031297 | A1 | 2/2016 | Maier | |
| 2017/0136855 | A1* | 5/2017 | Yasuda | B60J 1/2013 |
| 2017/0253109 | A1* | 9/2017 | Lekar | B60J 1/2016 |
| 2017/0314309 | A1* | 11/2017 | Sauer | B60J 1/2022 |
| 2018/0001747 | A1* | 1/2018 | Jonas | B60J 1/2025 |

FOREIGN PATENT DOCUMENTS

| | | | | |
|---|---|---|---|---|
| DE | 102012019903 A1 | * | 5/2013 | ............ B60J 1/2036 |
| DE | 102014215154 A1 | * | 2/2016 | ............ B60J 3/0226 |
| EP | 1 782 979 A2 | | 5/2007 | |
| EP | 2 979 907 A1 | | 2/2016 | |

OTHER PUBLICATIONS

German Office Action issued in Application No. 10 2016 203 382.4, dated Nov. 24, 2016 (5 pages).

* cited by examiner

SHADING DEVICE FOR A VEHICLE INTERIOR

CROSS-REFERENCE TO RELATED APPLICATIONS

This claims priority from German Patent Application No. 10 2016 203 382.4, filed Mar. 2, 2016, the disclosure of which is hereby incorporated by reference in its entirety into this application.

FIELD OF THE INVENTION

The invention relates to a shading device for a vehicle interior, comprising a flexible shading structure which is displaceable between a compactly stored rest position and a deployed shading position and which is provided with a pull-out profile on its face end region that is in front in the deployment direction, the pull-out profile having a central portion and on opposite end sides of the central portion telescopic shiftable guiding portions which are displaceable in vehicle-related guidances.

BACKGROUND OF THE INVENTION

Such a shading device is disclosed in EP 1 782 979 A2. The known shading device is intended for shading a rear window of an automotive passenger vehicle. The shading device includes a flexible, sheet-type shading structure which is held on a winding shaft for winding up and off. In a rest position, the shading structure is positioned below a rear window shelf of the vehicle interior wound up on the winding shaft. The shading structure has a pull-out profile on a face end region that is in front in the deployment direction which, in the rest position of the shading structure, is stored in the area of the rear window shelf. The opposite face end regions of the pull-out profile are displaceable in parallel in guidances fixed to the vehicle which extend lengthwise of C-pillars of a vehicle body. The guidances fixed to the vehicle extend in the region of the C-pillars starting from the bottom obliquely upwards and to the front. Since the C-pillars are inclined towards a roof area of the vehicle and towards a vehicle center, the guidances also converge in an oblique manner. Consequently, during a parallel displacement of the pull-out profile, said pull-out profile has to be adapted to the permanently changing distance between the opposite guidances. For that purpose, the pull-out profile has a central portion with a respective guiding portion mounted for telescopic shifting on each of the opposite face sides thereof. On the face end sides of both the guiding portions are provided entrainers which are guided in the vehicle-related guidances. The entrainers are driven by helix cables which are lengthwise displaced in the vehicle-related guidances in a synchronous move by a drive unit. In order to prevent, in the deployed shading position, that a light gap remains between a roof liner and the pull-out profile, which would affect the shading function of the vehicle interior, the pull-out profile is provided with a contour plate fixedly disposed on the central portion, the contour plate being shaped corresponding to a contour of the roof liner. In addition, the pull-out profile is guided along the vehicle-related guidances via a pull-out path, which causes longitudinal displacement of the pull-out profile and also tilting of the pull-out profile over its pull-out path. As a result, the pull-out profile is twisted by a certain amount during a movement from the rest position up to the deployed shading position such that the contour plate, resting essentially horizontally in the region of the rear window shelf, is positioned upstanding together with the pull-out profile in the region of the deployed shading position, in order to cover the light gap.

SUMMARY OF THE INVENTION

An object of the invention is to provide a shading device of the above mentioned type which allows a good shading function in the deployed shading position using simple means.

This object is achieved in that a shield is disposed on the central portion, which is mounted to be movable relative to the central portion between a rest condition and a functional condition, and in that for displacement of the shield in at least one direction between the rest condition and the functional condition a forced control device is provided to displace the shield in response to a shifting move of at least one guiding portion. With the solution according to the invention, there is merely one movable shield provided for covering the light gap in the shading position, but not a sophisticated curvature of the vehicle-related guidances, as provided in the prior art. According to the invention, the vehicle-related guidances can have a straight extension, whereby a low frictional and simple guidance of the guiding portions of the pull-out profile can be achieved. According to the invention, the telescopic mobility of the guiding portions relative to the central portion of the pull-out profile is used to achieve the desired displacement of the shield. The shield can be mounted for linear movement in one plane or along a curved track or even pivoting in relation to the central portion. The forced control device preferably has a mechanical design including complementary contact surfaces like sliding tracks, inclined planes or corresponding transmissions or similar. The forced control device can be embodied such that it moves the shield both in the rest condition and in the functional condition. As an alternative, the forced control device can be configured such that it acts upon the shield merely in one direction, namely, in the direction towards the functional condition or in the direction towards the rest condition. Movement of the shield in the respective other direction can be by gravitation or also by spring force of a spring unit. According to the invention, the shading device is provided for shading of side windows or rear windows or also of front windows of vehicle interiors. With particular advantage, the shading device is provided for shading the vehicle interior of a passenger vehicle. In case the shading device is used for shading of a side window of a passenger vehicle, a vehicle-related boundary contour is preferably a corresponding side window frame. In case the shading device is used for shading of a rear window of a vehicle interior of a passenger vehicle, the vehicle-related boundary contour is a roof liner contour of a roof area of the vehicle interior. In general, the shading device is also provided for shading of front windows of automotive vehicles. The shading device according to the invention is suitable for any land-based vehicles, waterborne vehicles and aircraft and, thus, in particular for wheeled vehicles and tracked vehicles, for railway vehicles and for airplanes.

In an embodiment of the invention, a return spring arrangement is assigned to the shield and exerting a permanent spring load on the shield in the direction towards the rest condition. In this embodiment, the forced control device is provided to displace the shield in the direction towards the functional condition.

In a further embodiment of the invention, the forced control device includes complementary mechanical control contours on at least one guiding portion on the one hand side and on the shield on the other hand side, which cooperate during a displacement movement of the pull-out profile between the rest position and the shading position. The mechanical control contours of the at least guiding portion on the one hand side and of the shield on the other hand side are in abutment, in order to achieve the desired forced control. Preferably, both the guiding portions are provided with corresponding control contours, and the shield has two complementary control contours for each guiding portion, in order to achieve reliable pivoting to the functional condition even with a shield of great length. However, in case of a shield of sufficiently great rigidity, it is also possible to provide merely one of the two guiding portions with a mechanical control contour, and to provide a complementary mechanical control contour on the shield merely in the region of said guiding portion, in order to allow pivoting of the shield to the functional condition by forced control.

In a further embodiment of the invention, the control contours have a design of sliding contours displaceable in relation to each other. Advantageously, the at least one guiding portion is provided with a ramp surface acting as a sliding contour in a face end region facing the other guiding portion. Advantageously, the shield has at least one control cam which protrudes into a trajectory of the guiding portion and is provided with a sliding contour that is matched to the ramp surface. The ramp surface and the complementary sliding contour interact in the manner of inclined planes.

In a further embodiment of the invention, a peripheral contour of the shield is matched to a vehicle-related boundary contour of a vehicle interior lining in the region of the shading position of the shading structure in such a manner that the peripheral contour in the functional condition of the shield is aligned essentially flush with the vehicle-related boundary contour. Thereby, an at least almost complete shading of a window of an automotive vehicle is achievable.

In a further embodiment of the invention, the forced control device is assigned to the pull-out profile and has at least one control element movably mounted on the pull-out profile, which element is contactable with the shield for transferring the shield to the functional condition and/or the rest condition. Thereby, the shield can have a most simple design of a plate-type component or strip-type component. The at least one control element engages preferably on a bottom side of the shield facing the pull-out profile, in that the control element is supported on the shield in sliding or rolling move.

In a further embodiment of the invention, the at least one control element is mounted on the central portion for linear movement transversely to a shifting movement of at least one guiding portion. Consequently, a shifting movement of the guiding portion is translated to a force-controlled linear movement of the control element transversely to the direction of shifting of the guiding portion.

In a further embodiment of the invention, the at least one control element is pivotably mounted on the guiding portion or the central portion. The control element is pivotably mounted for movement between a rest position countersunk in the pull-out profile and a functional position pivoted outwards in a direction of the shield. The control element can be associated with a return unit, in particular in the form of a return spring, which holds the control element permanently in the rest position within the pull-out profile without any loading by the guiding portion.

In a further embodiment of the invention, the at least one guiding portion and the at least one control element have mutually complementary control contours which contact one another in sliding or rolling move for displacement movements of the control element and the guiding portion. Preferably, the control contours are sliding contours. As an alternative, it is possible that at least one control contour is assigned at least one roller or rolling element, rolling on the control contour of the respective other part.

Further advantages and features of the invention will become apparent from the claims and the description below of preferred exemplary embodiments of the invention, illustrated with reference to the drawings.

DETAILED DESCRIPTION

Figure 1:
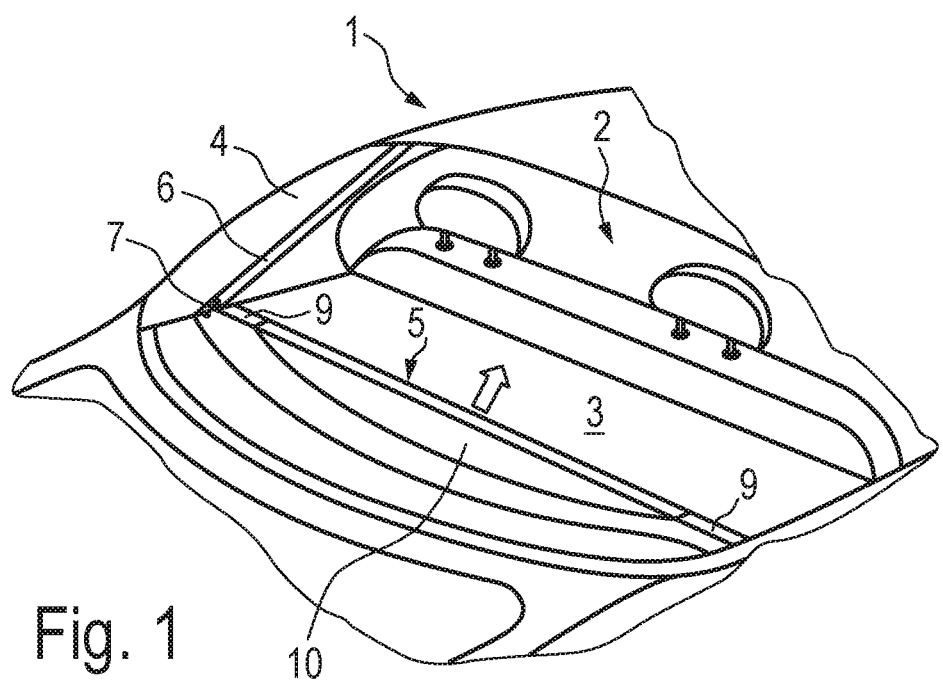
FIG. 1 shows a section of a vehicle interior of a passenger vehicle including one embodiment of a shading device according to the invention in a rest position.
Figure 2:
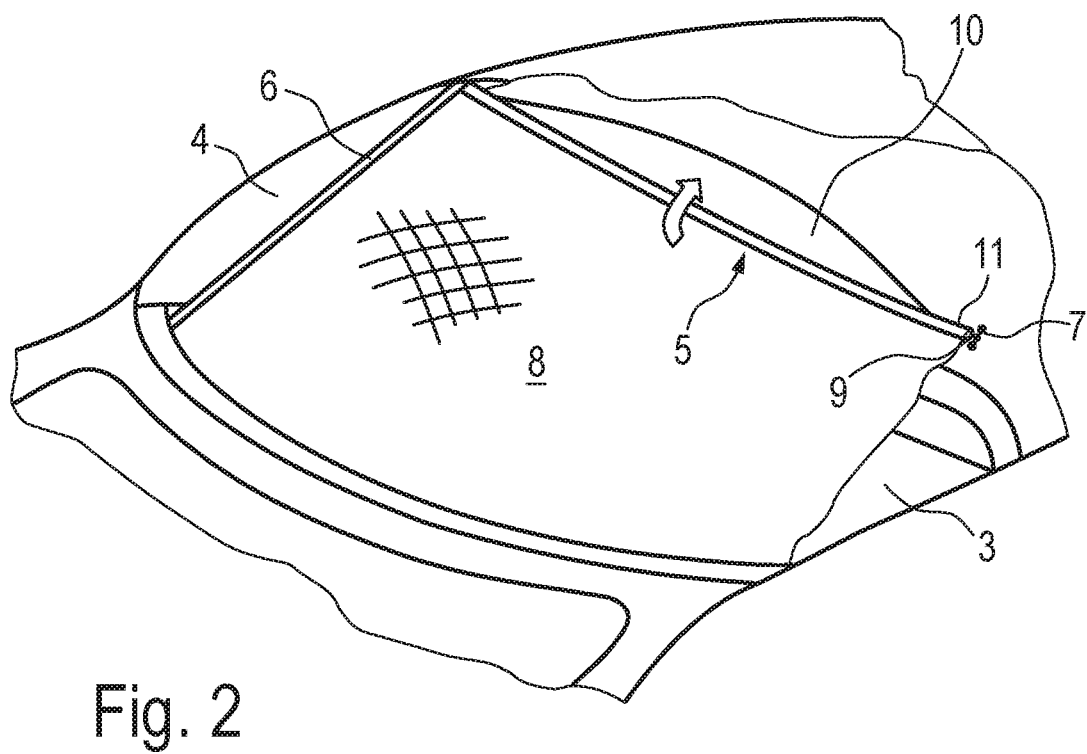
FIG. 2 shows the shading device according to FIG. 1 in a shading position.
Figure 3:
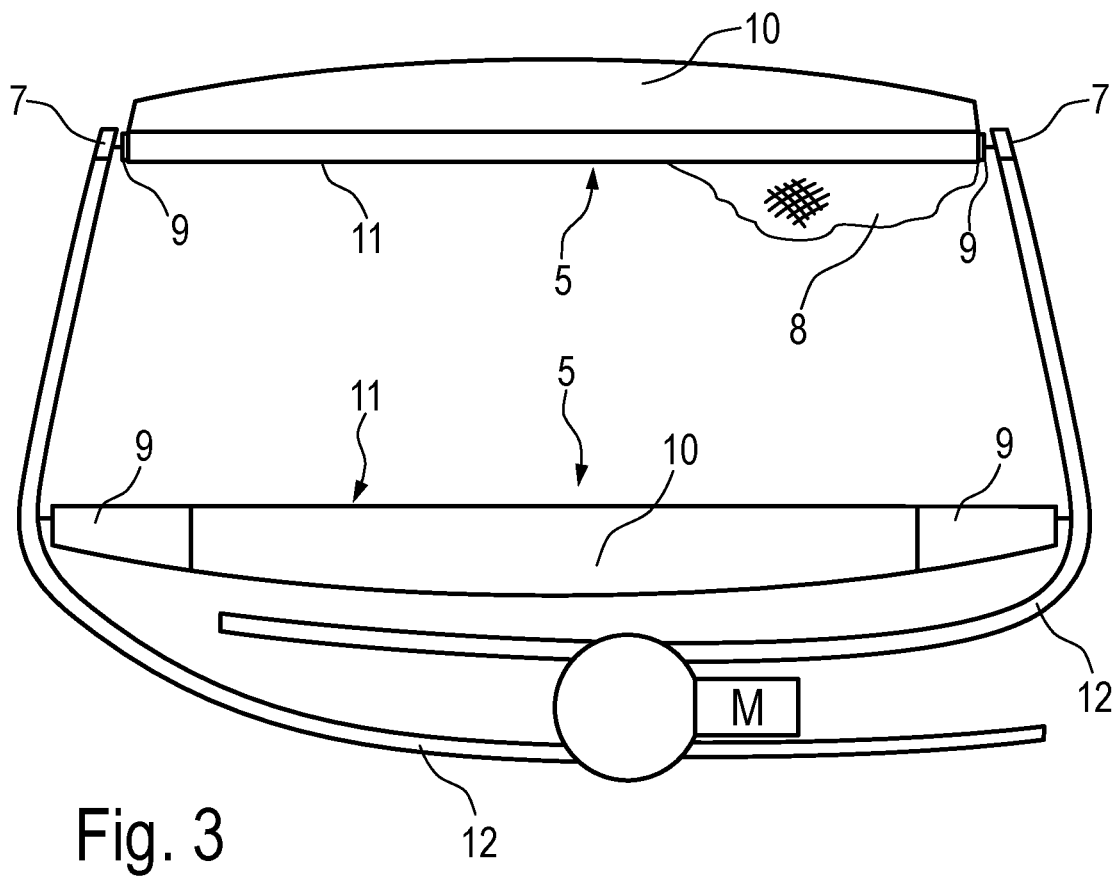
FIG. 3 shows a schematic illustration of the shading device according to FIGS. 1 and 2 in the rest position and in the shading position.

A passenger vehicle 1 according to FIGS. 1 and 2 has a vehicle interior 2 which is limited to the rear side by a rear window. The rear window ends on opposite sides of the vehicle in a respective C-pillar region. A shelf surface 3 extends essentially horizontally between the opposite C-pillar regions 4 of the vehicle interior 2. A shading device is provided in the region of said shelf surface 3, which shading device is described in more detail below with reference to the FIGS. 3 to 8 and is intended to shade the inclined rear window. As a result, entering of excessive solar radiation through the rear window into the vehicle interior 2 is prevented.

The shading device comprises a flexible, sheet-type shading structure 8 which is embodied in a textile woven or knitted fabric or as a film web. The shading structure 8 is held on a winding shaft for winding up and off, in a manner not illustrated in more detail, with the shaft rotatably mounted to the vehicle below the shelf surface 3. The winding shaft extends in the transverse direction of the vehicle. The shading structure 8 is extendable from the rest position wound-up on the winding shaft obliquely upwards and to the front—in relation to a longitudinal direction of the vehicle—to a shading position, as illustrated in FIG. 2. For winding the shading structure 8 up or off, the shading structure 8 is fixed to a pull-out profile 5 on its face end region that is in front in the pull-out direction, what will be described in more detail below. The pull-out profile 5 is provided with entrainers 7 on its opposite face end regions, which entrainers are mounted for longitudinal displacement in vehicle-related guidances 6. The vehicle-related guidances 6 are disposed in the region of C-pillar portions 4 of the vehicle interior and extend in analogy to the inclination of the rear window and the inclination of the C-pillar portions 4 obliquely upwards and to the front. Thereby, the opposite guidances 6 are inclined inwards towards the vehicle center so that each guidance 6 is inclined, starting from a lower end region in the vicinity of the shelf surface 3, in a vertical direction of the vehicle, in a transverse direction of the vehicle and in a longitudinal direction of the vehicle. The guidances 6 extend, starting from their lower end region, obliquely upwards towards the center of the vehicle and in the longitudinal direction of the vehicle towards the front. In the guidances 6 are provided flexible helix cables 12 capable of exerting pulling and pushing forces on the entrainers 7 for displacement of the entrainers 7 in the guidances 6. Each entrainer 7 is assigned a corresponding helix cable 12, which are driven synchronously in relation to each other via a central drive unit, according to FIG. 3. The drive unit includes an electric motor M and a gear mechanism, not described in more detail, exerting corresponding synchronous displacement movements on the two helix cables 12. The pull-out profile 5 is displaceable in parallel by means of the helix cables 12 and the drive unit along the guidances between a rest position (illustrated below in FIG. 3) and a shading position (illustrated above in FIG. 3).

Since the distance of the opposite guidances 6, in which the helix cables 12 are guided, decreases from a lower end region towards a roof area of the vehicle interior 2, the length of the pull-out profile 5, extending in the transverse direction of the vehicle and held permanently in the guidances 6 by the entrainers 7, has to vary as well.

Figure 4:
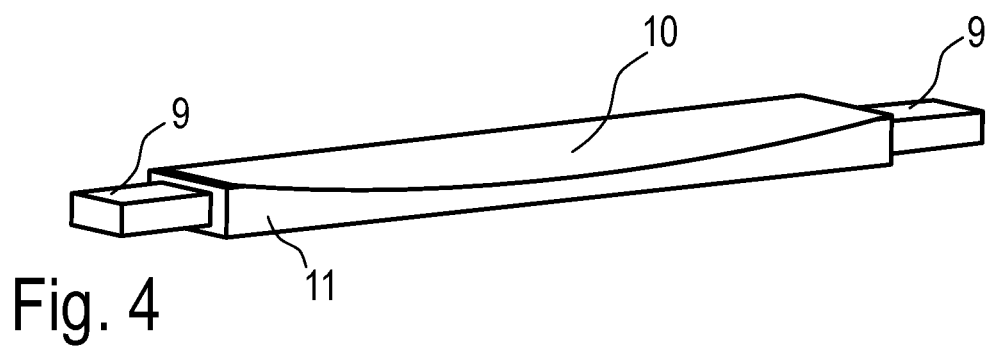
FIG. 4 shows a schematic illustration of a pull-out profile of the shading device according to FIG. 3 in a rest position.
Figure 5:
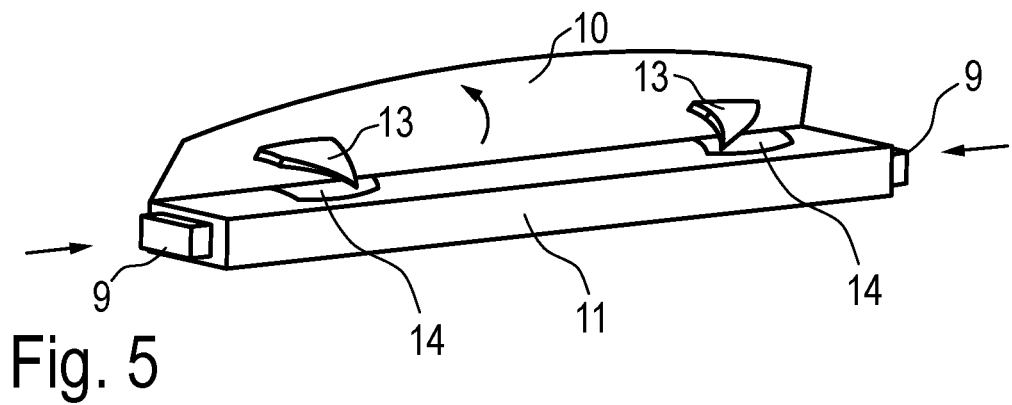
FIG. 5 shows a schematic illustration of the pull-out profile according to FIG. 4 in the shading position.

For that purpose, the pull-out profile 5 has a central portion 11 and two telescopic guiding portions 9 guided in the central portion 11, which guiding portions 9 protrude from the central portion 11 on opposite face sides thereof (FIGS. 4 and 5). The central portion 11 is at least partially designed as a hollow profile, in order to allow telescopic longitudinal displacing of the guiding portions 9 in the central portion 11. The guiding portions 9 are displaceable in opposite directions in relation to each other in the central portion 11, once the pull-out profile 5 is displaced between the rest position and the shading position of the shading structure 8. Each guiding portion 9 is connected to the respective entrainer 7 on its external face end, which entrainer again is connected to the respective helix cable 12 in the associated guidance 6.

Figure 6:
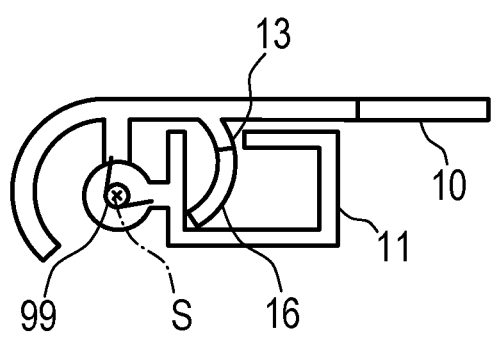
FIG. 6 shows a cross-sectional view of the pull-out profile according to FIG. 4 in the rest position.
Figure 7:
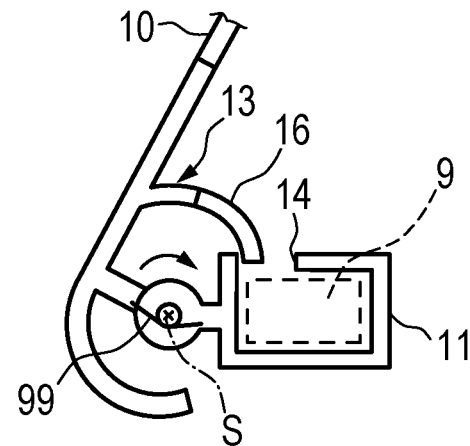
FIG. 7 shows a cross-sectional view of the pull-out profile according to FIG. 5 in the shading position.
Figure 8:
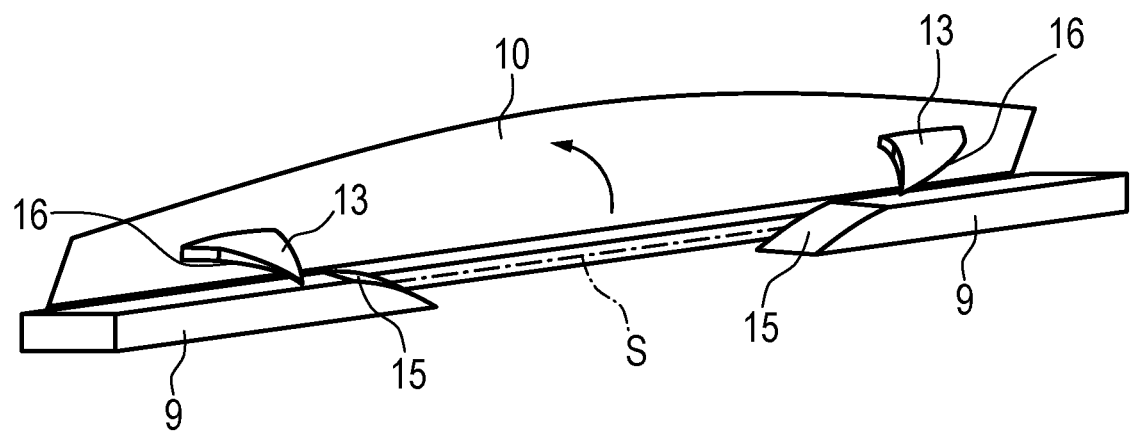
FIG. 8 shows parts of the pull-out profile according to FIGS. 4 to 7 for forced control of a shield of the pull-out profile.

Additionally, a shield 10 is mounted on the central portion 11 to be pivotable about a pivot axis S extending in the transverse direction of the vehicle (FIGS. 6 to 8). The shield is displaceable between a rest condition according to FIGS. 4 and 6 and a functional condition according to FIGS. 5 and 7, 8. A peripheral contour of the shield 10 is matched to a roof liner contour of the vehicle interior 2. As a result, the shield 10 in the straightened up functional condition according to FIGS. 3, 5, 7 and 8, when the shading structure 8 is transferred to its shading position, can close a remaining light gap between the central portion 11 and the roof liner contour in an essentially flush manner, so that in the shading position of the shading structure 8, there is no important visible gap left above the central portion 11, through which light can enter into the vehicle interior.

The shield 10 is held permanently in its rest condition according to FIGS. 4 and 6 by a return spring arrangement 99. Consequently, torque is applied to the shield 10 by the spring force of the return spring arrangement 99. The return spring arrangement 99 in the embodiment as illustrated is at least one leg spring which is disposed coaxially to the pivot axis S and supported with a respective leg end on the central portion 11 on the one hand side and on the shield 10 on the other hand side.

The shield 10 is pivoted forcedly from the rest condition to the functional condition by means of a mechanical forced control device, described in more detail below, during a transfer move of the pull-out profile 5 from the rest position of the shading structure 8 to the shading position of the shading structure 8. Pivoting the shield 10 from the rest condition to the functional condition is in response to the telescopic displacement of the guiding portions 9. For that purpose, the shield 10 comprises, in the region of its bottom side, two control cams 13 projecting inwards into the central portion 11, which cams each project through a corresponding recess 14 in the region of an upper side of the central portion 11 in the rest condition of the shield 10. The two control cams 13 protrude into the linear trajectory of the guiding portions 9. Each control cam 13 has an obliquely extending sliding contour 16 acting as a control contour in terms of the invention. The sliding contour 16 extends starting from a bottom side of the shield 10 towards the center of the pull-out profile 5 obliquely downwards and inwards. A complementary control contour is assigned to each of the sliding contours 16 of the control cams 13 on an interior face end region of each guiding portion 9, the contours being designed as a ramp surface 15. The respective ramp surface 15 is arranged on the face end of the guiding portion 9 opposite the respective entrainer 7. The ramp surface 15 extends from an upper side of the respective guiding portion 9 towards the center of the pull-out profile obliquely downwards.

In the rest position of the pull-out profile 5 and the shading structure 8 the two guiding portions 9 are displaced outwards relative to the central portion to such an extent that the ramp surfaces 15 of the guiding portions 9 do not cooperate with the control cams 13. In said position, the shield 10 is in its rest condition which is secured by the spring force of the return spring arrangement 99. The control cams 13 are plunged in through the recesses 14 into the interior of the central portion 11. Once the helix cables 12 displace the entrainers 7 in the guidances 6 upwards, the guiding portions 9 are forcedly shifted inwards towards the center of the pull-out profile 5 into the central portion 11. Thereby, the ramp surfaces 15 and the sliding contours 16 of the control cams 13 come in operative connection with each other, whereby the ramp surfaces 15 forcedly urge the control cams 13 upwards. Since the control cams 13 in the region of the bottom side of the shield 10 are fixedly connected to the shield 10, said shield 10 is forcedly pivoted upwards. In the shading position of the shading structure 8 the guiding portions 9 are shifted so far inwards into the central portion 11 that the shield 10 has reached its straightened up functional condition, wherein a remaining visible gap between the central portion 11 and the roof liner contour is covered.

Once the shading structure 8 is displaced back downwards in the direction towards its rest position, the guiding portions 9 of the pull-out profile 5 forcedly move outwards again. The return force of the return spring arrangement 99 ensures that the control cams 13 remain in abutment on the ramp surfaces 15 of the guiding portions so that the shield 10 is forcedly pivoted back in the direction towards the rest condition by the spring force of the return spring arrangement 99. Once the pull-out profile 5 has reached the rest position of the shading structure 8, the shield 10 is also transferred back to the rest condition.

The embodiments illustrated with reference to FIGS. 9 to 13 of a shading device according to the invention correspond in terms of general construction and general functionality to the shading device for the rear window of a passenger vehicle, as described and illustrated with reference to FIGS. 1 to 8. Consequently, parts and portions of similar functionality in the embodiments according to FIGS. 9 to 13 are indicated with the same reference numerals with a small letter "a", "b", "c" added for the respective embodiment. To avoid repetitions, as to the embodiments according to FIGS. 9 to 13 reference is made additionally to the explanations in relation to the shading device according to FIGS. 1 to 8. Differences of the embodiments according to FIGS. 9 to 13 will be discussed below.

Figure 9:
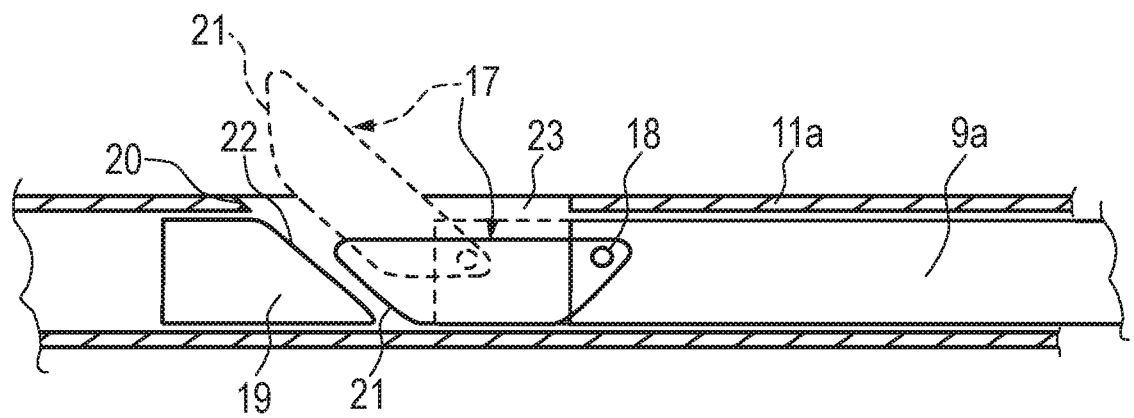
FIG. 9 shows a schematic illustration in a sectional view of a portion of another embodiment of a shading device according to the invention in the region of a central portion of the pull-out profile.
Figure 12:
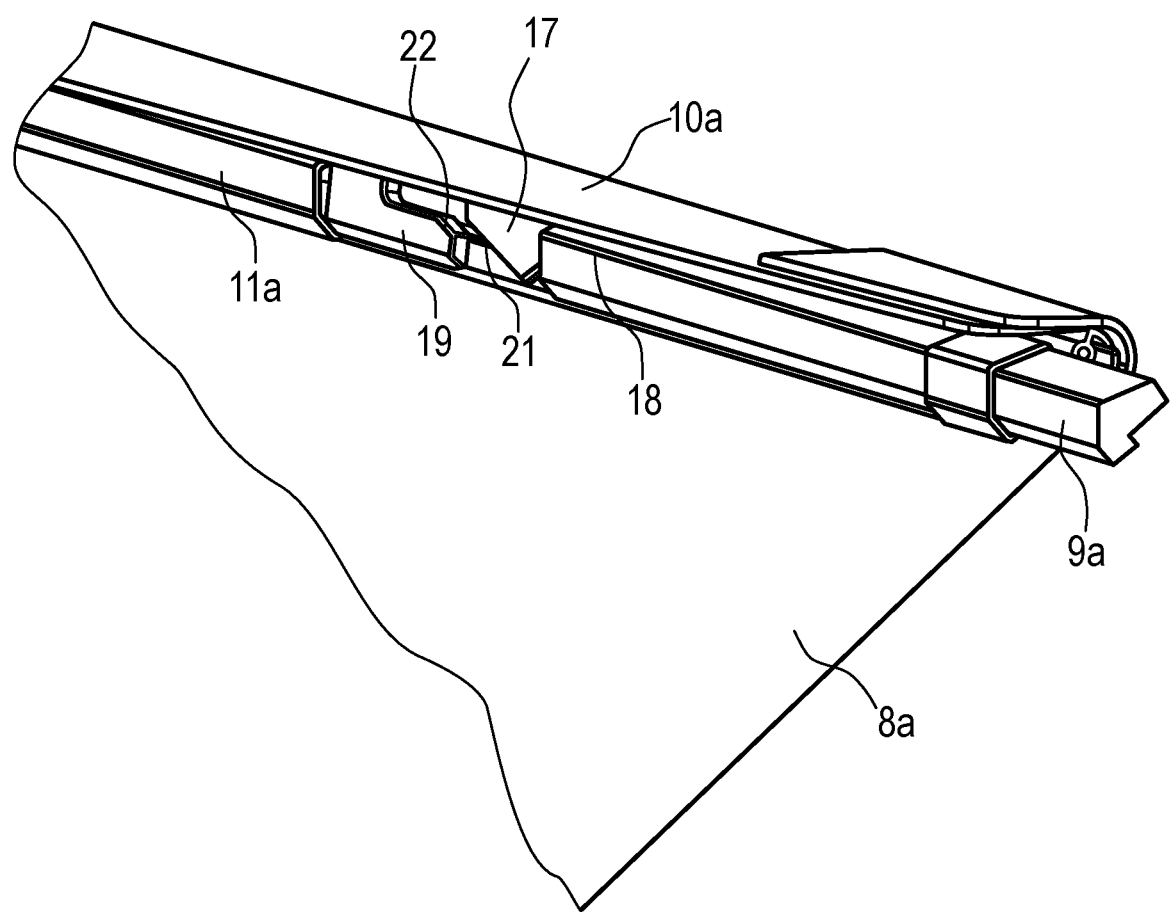
FIG. 12 shows a perspective view of a partial section of the shading device according to FIG. 9 in a rest condition of the shield.
Figure 13:
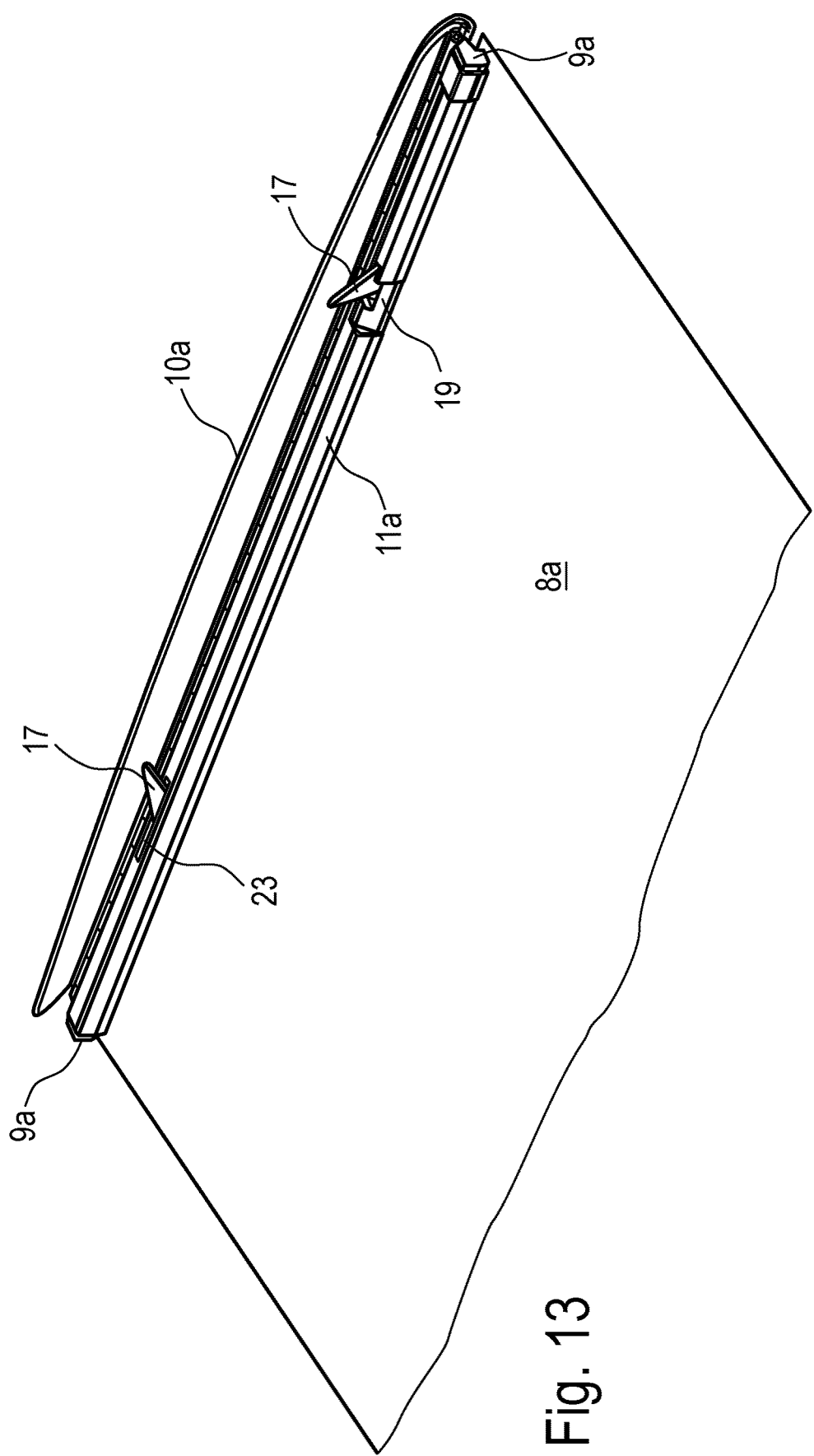
FIG. 13 shows a perspective view of the shading device according to FIG. 12 in a functional condition of the shield.

With the shading device according to FIGS. 9 and 12, 13 the shading structure 8a is disposed on a central portion 11a which is part of the pull-out profile. On opposite face sides of the central portion 11a are mounted two telescopic guiding portions 9a which protrude from the central portion 11a on the face side. The respective guiding portion 9a is connected to an entrainer in a similar manner as has been described in relation to the embodiment according to FIGS. 1 to 8 with reference to FIGS. 1 to 3. An essential difference of the embodiment according to FIGS. 9, 12 and 13 is in that the forced control device has a respective control element 17 in the region of each guiding portion 9a, which control element is mounted on a face end of the respective guiding portion 9a facing towards a center of the pull-out profile for pivoting between a rest position, wherein the control element 17 is positioned countersunk within the pull-out profile 11a, and a functional position, wherein the control element 17 is pivoted upwards through a passage slot 23 of the central portion, in order to urge the shield 10a away from the central portion 11a towards its functional condition. The control element 17 is pivotably mounted on the respective guiding portion 9a by means of a pivot bearing 18. The control element 17 has a control contour 19 on the front side, which control contour is configured to be brought into sliding contact with a complementray control contour 22 of a supporting part 19 disposed stationarily in the central portion 11a and a sliding contour 20 provided in the region of the slot 23. The supporting part 19 together with the sliding contour 22 forms a ramp surface for the control contour 21 of the control element 17 which likewise is embodied in a ramp surface of complementary design. During a telescopic shifting move of the guiding portion 9a inwards, the control element 17 is forcedly moved upwards, whereby the element penetrates outwards through the passage slot 23 and is urged against a bottom side of the shield 10a. As a result, the pivotably mounted shield 10a is forcedly transferred to its functional condition.

Figure 10:
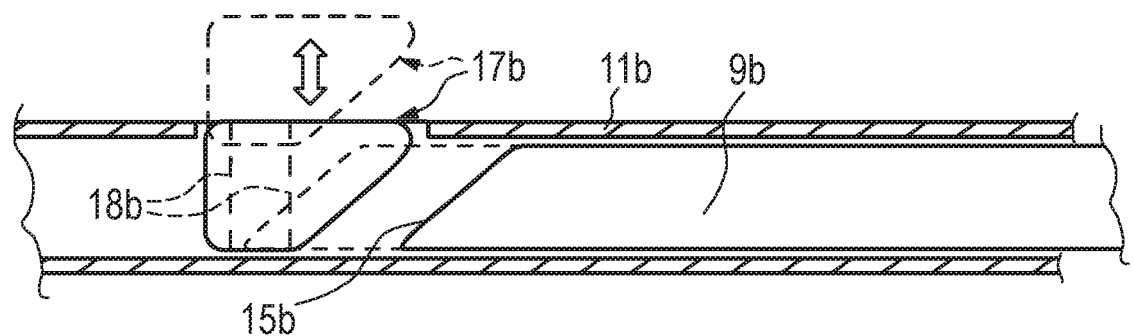
FIG. 10 shows an illustration similar to FIG. 9 of another embodiment of a shading device according to the invention similar to FIG. 9.

In the embodiment according to FIG. 10, the forced control device has a control element 17b of cam-type design mounted for linear movement in the central portion 11b of the pull-out profile (upwards in the drawing). The control element 17b is guided for linear movement, transversely in relation to the shifting direction of the guiding portion 9b, by means of a linear guidance 18b which can be configured as a dovetail guide or a similar linear guidance. The linear guidance 18b is integrated in the central portion 11b of the pull-out profile. The control element 17b has a guiding profile of complementary design, in order to allow shifting by linear movement in the linear guidance 18b. The guiding portion 9b has, on the face side, a control contour 15b designed as a ramp surface cooperating with a complementary sliding contour, not described in more detail, in the region of the control element 17b. The corresponding sliding surfaces are designed in relation to the shifting direction of the guiding portion 9b and the sliding direction of the control element 17b such that there is no self-locking effect occurring when the guiding portion 9b meets the control element 17b. As is apparent with reference to the double arrow in FIG. 10 and the illustration in dashed lines, during a shifting movement of the guiding portion 9b towards the center of the central portion 11b the control element 17b is forcedly displaced upwards, whereby the control element 17b is displaced upwards from its rest condition countersunk in the central portion 11b through a slot or a recess of a wall of the central portion 11b. As a result, the bottom side of the pivotable shield is acted upon in the same manner as in the case of the embodiment according to FIGS. 9, 12 and 13. Consequently, the shield is pivoted outwards away from its rest condition abutting on the central portion 11b to its functional condition.

Figure 11:
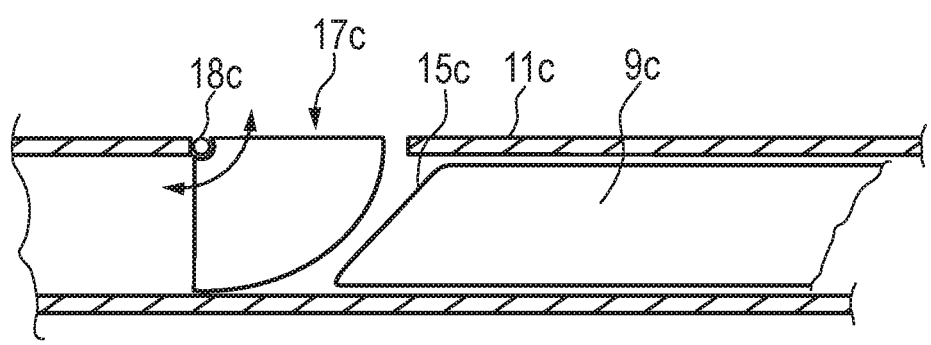
FIG. 11 shows an illustration similar to FIG. 10 of another embodiment of a shading device according to the invention similar to FIGS. 9 and 10.

In the embodiment according to FIG. 11, the control element 17c is likewise movably mounted on the central portion 11c of the pull-out profile. However, in contrast to the embodiment according to FIG. 10, the control element 17c is pivotably mounted in the region of a pivot bearing 18c. The pivot bearing 18c is provided on a wall in a peripheral region of the passage slot of the central portion 11c. The control element 17c has a circular arc-type control contour, not described in more detail, which cooperates with the control contour 15c of the guiding portion 9c designed as a ramp surface. Also, these two control contours are embodied such that self-locking is prevented. During a shifting movement of the guiding portion 9c towards the center of the central portion 11c, i.e. towards the left in FIG. 11, the control contour 15c comes to abutment on the control contour of the control element 17c and forcedly urges the control element 17c upwards, whereby said element is pivoted from its rest condition countersunk in the central portion 11c outwards in the direction of the arrow. Thereby, a peripheral region of the control element 17c comes to abutment on a bottom side of the shield, whereby the desired forced control guiding of the shield is obtained.

The invention claimed is:

1. A shading device for a vehicle interior, comprising a flexible shading structure displaceable between a compactly stored rest position and a deployed shading position, and a pull-out profile provided on a face end region of the flexible shading structure that is in front in a deployment direction, the pull-out profile having a central portion and telescopic shiftable guiding portions on opposite end sides of the central portion, the telescopic shiftable guiding portions being displaceable in vehicle-related guidances, wherein a shield is disposed on the central portion, the shield being mounted to be movable relative to the central portion between a rest condition and a functional condition, and a forced control device displaces the shield in at least one direction between the rest condition and the functional condition in response to a shifting movement of at least one of the guiding portions.

2. The shading device according to claim 1, wherein the shield is pivotably mounted on the central portion.

3. The shading device according to claim 1, wherein a return spring arrangement is assigned to the shield and exerting a permanent spring load on the shield towards the rest condition.

4. The shading device according to claim 1, wherein a peripheral contour of the shield is matched to a vehicle-related boundary contour of a vehicle interior section in the region of the shading position of the shading structure in such a manner that the peripheral contour in the functional condition of the shield is aligned essentially flush with the vehicle-related boundary contour.

5. The shading device according to claim 1, wherein the forced control device includes complementary mechanical control contours on the at least one of the guiding portions and on the shield, the control contours cooperate during a displacement movement of the pull-out profile between the rest position and the shading position.

6. The shading device according to claim 5, wherein the control contours on the at least one of the guiding portions and on the shield are slidably displaceable in relation to each other.

7. The shading device according to claim 6, wherein the control contours of the at least one of the guiding portions comprises a ramp surface in a face end region thereof that faces an opposite one of the guiding portions.

8. The shading device according to claim 7, wherein control contours of the shield comprises at least one control cam which protrudes into a trajectory of the at least one of the guiding portions and is provided with a sliding contour that is matched to the ramp surface.

9. The shading device according to claim 1, wherein the pull-out profile includes the forced control device and the forced control device has at least one control element movably mounted on the pull-out profile, the at least one control element being contactable with the shield for transferring the shield to the functional condition, the rest condition, or both the functional condition and the rest condition.

10. The shading device according to claim 9, wherein the at least one control element is mounted on the central portion for linear movement transversely to a shifting movement of at least one guiding portion.

11. The shading device according to claim 9, wherein the at least one control element is pivotably mounted on the guiding portion or the central portion.

12. The shading device according to claim 9, wherein the at least one guiding portion and the at least one control element have mutually complementary control contours which contact one another for displacement movements of the control element and the guiding portion.

13. A shading device for a vehicle interior, comprising:
a flexible shading structure displaceable between a compactly stored rest position and a deployed shading position;
a pull-out profile provided on a face end region of the flexible shading structure that is in front in a deployment direction, the pull-out profile having a central portion and telescopic guiding portions on opposite end sides of the central portion, the telescopic guiding portions being telescopically received by the central portion, the telescopic guiding portions being displaceable in vehicle-related guides as the flexible shading structure is displaced between the compactly stored rest position and the deployed shading position;
a shield disposed on the central portion of the pull-out profile, the shield being mounted to be movable relative to the central portion between a rest condition and a functional condition; and
a forced control device displaces the shield in at least one direction between the rest condition and the functional condition in response to telescopic movement of at least one of the telescopic guiding portions in a direction transverse to the deployment direction of the flexible shading structure.

14. The shading structure according to claim 13, wherein the telescopic guiding portions are each telescopically received within the central portion of the pull-out profile.

15. The shading device according to claim 13, wherein the shield is pivotably mounted on the central portion.

16. The shading device according to claim 13, wherein a return spring arrangement is assigned to the shield and exerting a permanent spring load on the shield towards the rest condition.

17. The shading device according to claim 13, wherein the forced control device interacts with a ramp on the at least one of the telescopic guide portions to push the shield to functional condition.

\* \* \* \* \*